(12) United States Patent
Chen

(10) Patent No.: US 9,740,022 B1
(45) Date of Patent: Aug. 22, 2017

(54) GLASSES

(71) Applicant: Hwa Meei Optical Co., Ltd., Tainan (TW)

(72) Inventor: Chin-Ming Chen, Tainan (TW)

(73) Assignee: Hwa Meei Optical Co., Ltd., Tainan (TW)

( * ) Notice: Subject to any disclaimer, the term of this patent is extended or adjusted under 35 U.S.C. 154(b) by 0 days.

(21) Appl. No.: 15/180,064

(22) Filed: Jun. 12, 2016

(51) Int. Cl.
*G02C 1/08* (2006.01)
*G02C 5/22* (2006.01)

(52) U.S. Cl.
CPC ............ *G02C 1/08* (2013.01); *G02C 5/22* (2013.01); *G02C 2200/08* (2013.01)

(58) Field of Classification Search
CPC .................................. G02C 1/08; G02C 5/22
USPC ..... 351/90–101, 124, 128, 153, 116; 16/228
See application file for complete search history.

(56) References Cited

U.S. PATENT DOCUMENTS

| | | | | |
|---|---|---|---|---|
| 2,210,507 A * | 8/1940 | Spill | .................... | G02C 5/2209 351/116 |
| 3,762,804 A * | 10/1973 | Livas | ....................... | G02C 1/08 351/116 |
| 4,747,680 A * | 5/1988 | Hatano | .................... | G02C 1/08 16/228 |
| 5,963,295 A * | 10/1999 | Pernicka | ................. | A61F 9/025 2/442 |
| 6,056,399 A * | 5/2000 | Jannard | ................... | G02C 5/00 351/124 |
| 6,076,926 A * | 6/2000 | Kostka | ................... | G02C 3/003 351/113 |
| 8,911,075 B2 * | 12/2014 | Chen | ........................ | G02C 1/08 351/121 |

* cited by examiner

*Primary Examiner* — Hung Dang
(74) *Attorney, Agent, or Firm* — Bruce Stone LLP; Joseph Bruce

(57) ABSTRACT

Provided is a pair of glasses, including a frame, two temples and two fasteners. The frame includes two lens-holding portions and two end portions. Each of two end portions has an adjusting gap, and two holes are provided on both sides of the adjusting gap. Two temples are respectively pivoted on both end portions of the frame. Each of two fasteners connects with two holes to fix the adjusting gap.

4 Claims, 5 Drawing Sheets

GLASSES

BACKGROUND OF THE INVENTION

1. Field of the Invention

The present disclosure relates to a pair of glasses, and particularly relates to a pair of glasses, whose lenses are replaced conveniently.

2. The Prior Arts

The advancement of modern society often results in degradation of the vision of human beings. As such, glasses are now an integral part of our everyday lives. Since there will often be changes in human vision, therefore, the requirement for replacing lenses also exists. However, the glasses on the market today do not allow the lenses of users to be replaced conveniently. In addition, the replacement of the lenses of glasses often involves using force, and this often causes the frame of the glasses to be bent. Furthermore, since the lenses of the glasses are inconveniently replaced, thus, at times when the user needs a pair of sunglasses, the user will directly buy a pair of sunglasses, and he or she will not think about replacing the lenses of the glasses with a pair of lenses that can block the sun's rays. This may result in the user also needing to bring around a spare pair of sunglasses in addition to the normal pair of glasses, which causes inconvenience, need extra costs and is also not environmentally friendly.

Therefore, an objective of the present disclosure is how to provide a type of glasses that can enable users to replace their lenses with convenience, while at the same time increasing the efficiency of replacing lenses. Furthermore, this type of glasses is also environmentally friendly, and allows costs to be saved.

SUMMARY OF THE INVENTION

In light of the foregoing problems, an objective of the present disclosure is to provide a pair of glasses. The lenses of the pair of glasses can be replaced with convenience.

In order to achieve the above objective, the present disclosure provides a pair of glasses, including a frame, having two lens-holding portions and two end portions, wherein each of the two end portions has an adjusting gap, and two first holes are provided on both sides of the adjusting gap; two temples, respectively pivoted on both end portions of the frame; two fasteners, wherein each of the two fasteners connects with the two first holes to fix the adjusting gap.

In a preferred embodiment, each of the two fasteners may have two fixing shafts that are inserted into the two first holes.

In a preferred embodiment, the two fixing shafts may be tightly connected with the two first holes.

In a preferred embodiment, the pair of glasses further includes a connecting piece, connecting the two lens-holding portions.

In a preferred embodiment, each of the two temples has a hinge, each of the two lens-holding portions has two second holes, and the hinge is connected to the two second holes.

In accordance with the pair of glasses of the present disclosure, an end portion of each of the two lens-holding portions may have an adjusting gap, and two holes may be provided on both sides of the adjusting gap. In addition, each of the two fasteners may connect with the two holes to fix the adjusting gap. Accordingly, if it is necessary to replace the lenses, the fasteners can be removed from the holes, and then each of the two lens-holding portions is pulled to enable the adjusting gap to become bigger. As such, each new lens can be held by each lens-holding portion, and fixed by fixing the adjusting gap with each fastener that connects with the holes. Therefore, the replacement of the lens can be completed.

DETAILED DESCRIPTION OF THE PREFERRED EMBODIMENT

The detailed description of the present invention is provided in combination with the accompanying drawings.

Figure 1:
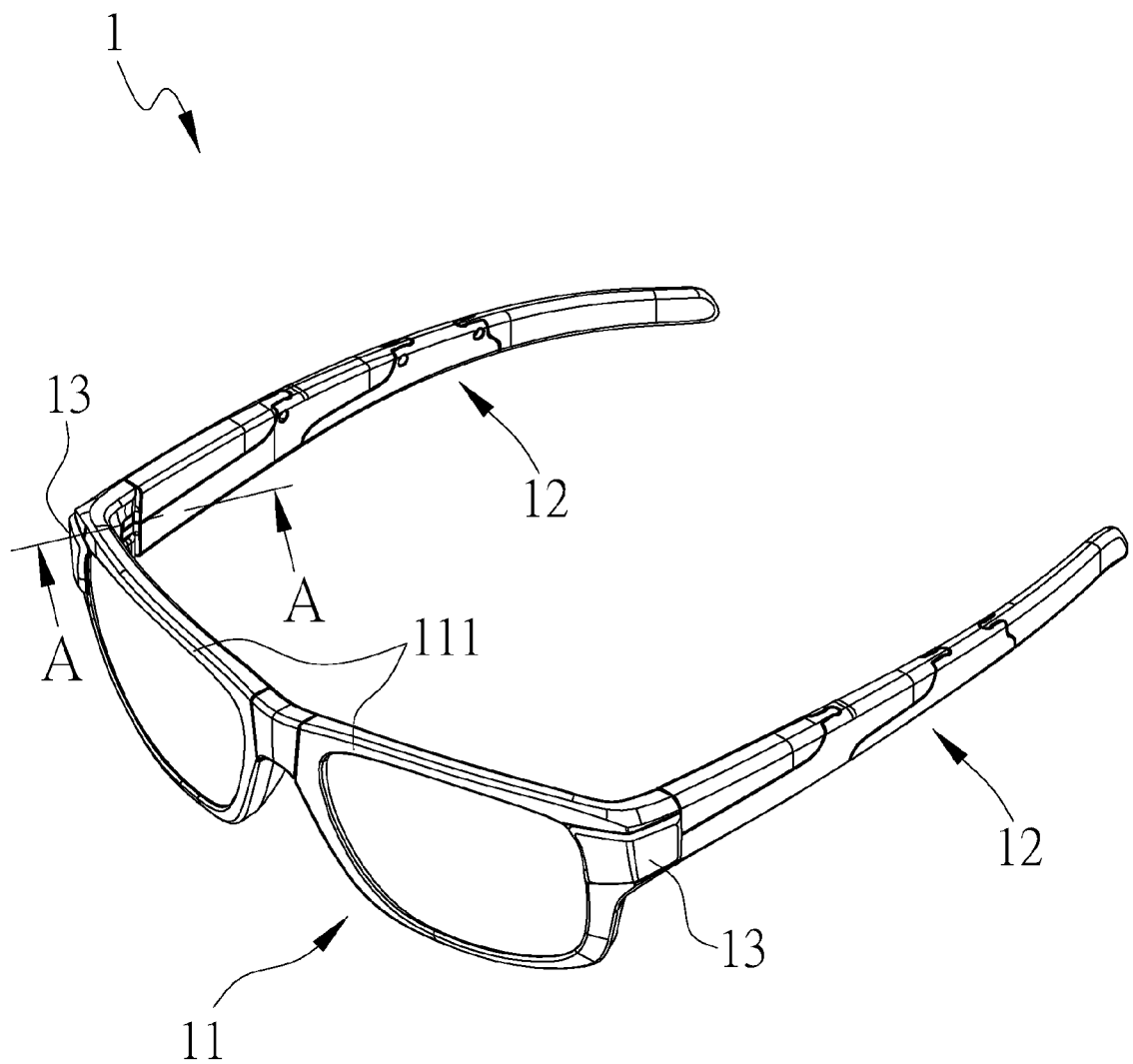
FIG. 1 is a schematic diagram of a pair of glasses according to an embodiment of the present disclosure.
Figure 2:
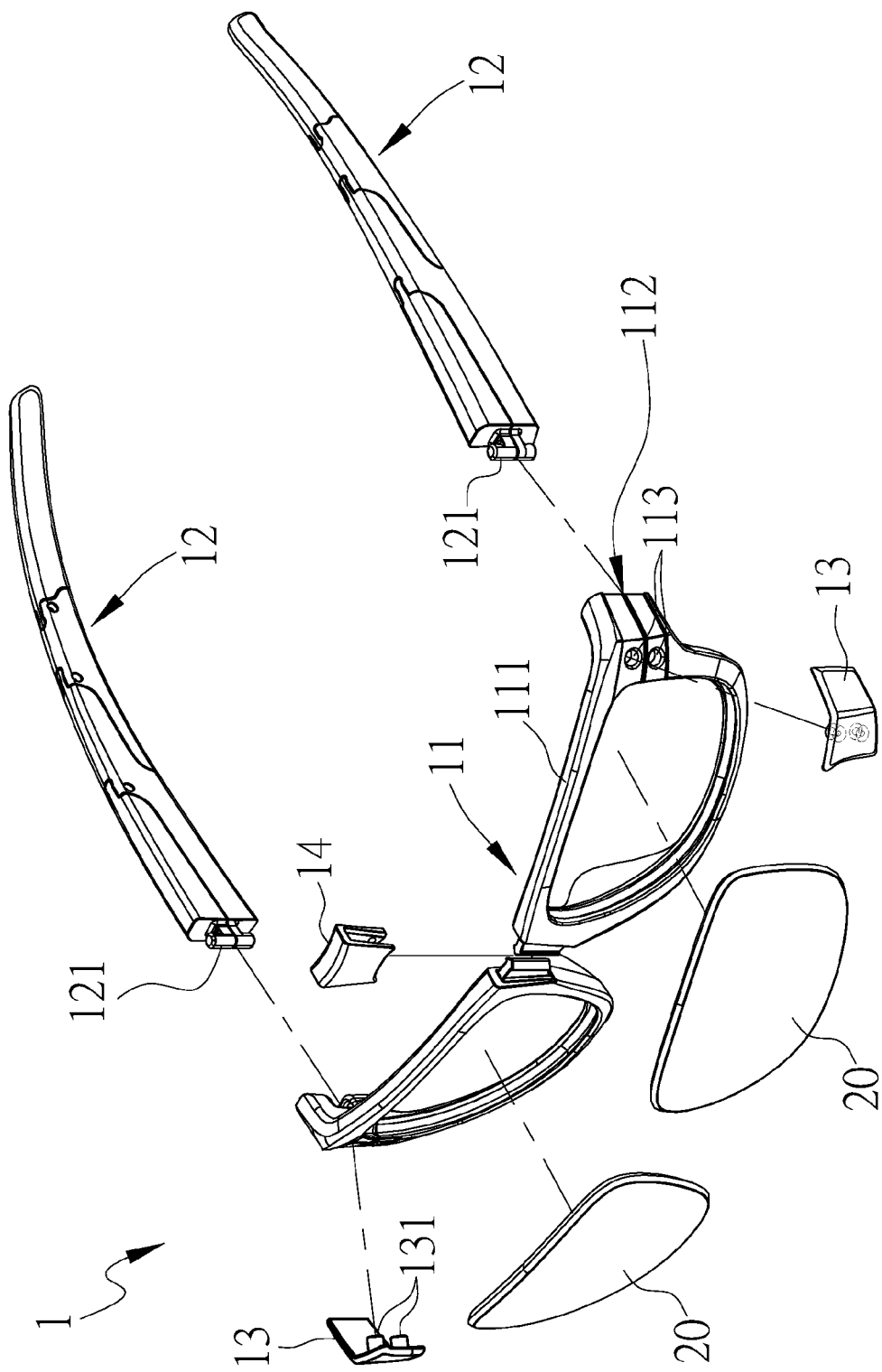
FIG. 2 is an exploded diagram of a pair of glasses according to an embodiment of the present disclosure.

FIG. 1 shows a schematic diagram of a pair of glasses 1 according to an embodiment of the present disclosure. FIG. 2 shows an exploded diagram of the pair of glasses 1 according to an embodiment of the present disclosure. The present disclosure does not limit the use of the pair of glasses 1. The pair of glasses 1 can be used in a normal life or at work. The pair of glasses 1 of the present disclosure can be used in a particular application based on the types of lens.

As shown in FIGS. 1 and 2, the pair of glasses of the present disclosure may include a frame 11, two temples 12 and two fasteners 13. The frame 11 may have two lens-holding portions 111. Lenses 20 may be held by two lens-holding portions 111. Two lens-holding portions 11 may be symmetrically disposed. An end portion of each of two lens-holding portions 111 may have an adjusting gap 112 (please referring to FIG. 3). As such, the end portion of each of two lens-holding portions 111 is at an outer side thereof. The user is able to pull the end portion of each of two lens-holding 111 to enable the adjusting gap 112 to become bigger or smaller. Two holes 113 may be provided on both sides of the adjusting gap 112; that is, two holes 113 may be provided on the upper and lower sides of the adjusting gap.

Two temples 12 may be respectively pivoted on both end portions of the frame 11; that is, two temples 12 may be respectively pivoted on both end portions of the frame 11 having two adjusting gaps 112. In the preferred embodiment of the present disclosure, each of two temples 12 may have a hinge 121, and each of two lens-holding portions 111 may have two holes 114 (please referring to FIG. 3). The hinge 121 may be connected to two holes 114. Each of two temples 12 may have a tip. The tip may be a curved hook or a non-curved hook, but not limited to these. The material of two temples 12 may be plastic, metal alloys and the like, but not limited to these.

Each of two fasteners 13 may connect with two holes 113 to fix the adjusting gap 112. In the preferred embodiment of the present disclosure, each of two fasteners may have two fixing shafts that are inserted into the holes 113. In addition, each of two fasteners 13 may connect with two holes 113 to fix the frame 11, two lenses 20 and two temples 12. As such, it is not necessary to connect the frame 11 and two temples with screws.

In the preferred embodiment of the present disclosure, the pair of glasses 1 may further include a connecting piece 14 that connects two lens-holding portions 111. In the preferred embodiment of the present disclosure, two lens-holding portions 111 may be separated from each other, but may be linked together by the connecting piece 14. Accordingly, the connecting piece 14 may connect two lens-holding portions 111 by means of engagement or embeddedness. In the preferred embodiment of the present disclosure, the connecting piece 14 may be located between two lens-holding portions 111.

Figure 3:
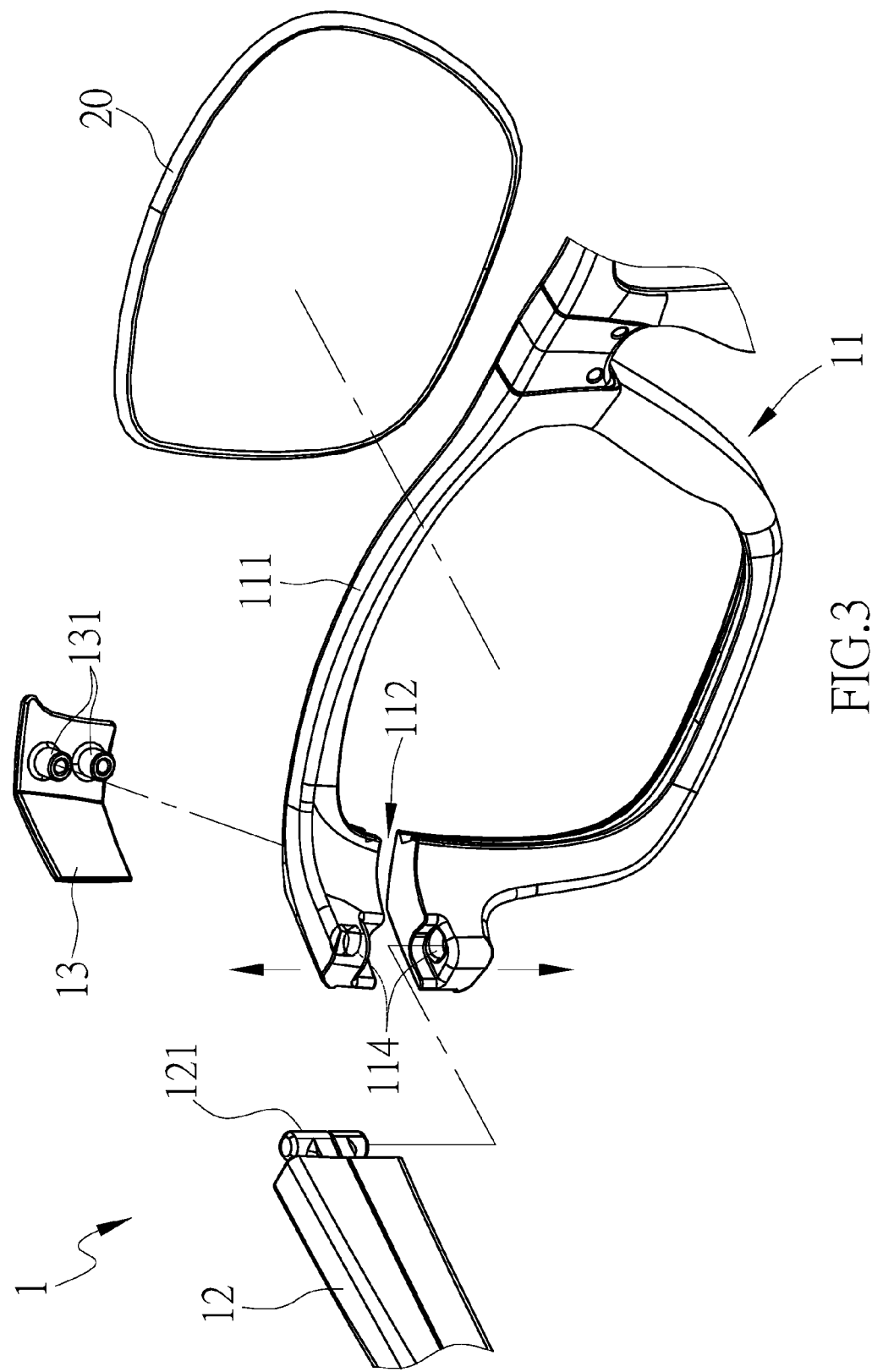
FIG. 3 and FIG. 4 show respectively an exploded diagram and an assembly diagram of a pair of glasses according to an embodiment of the present disclosure.
Figure 4:
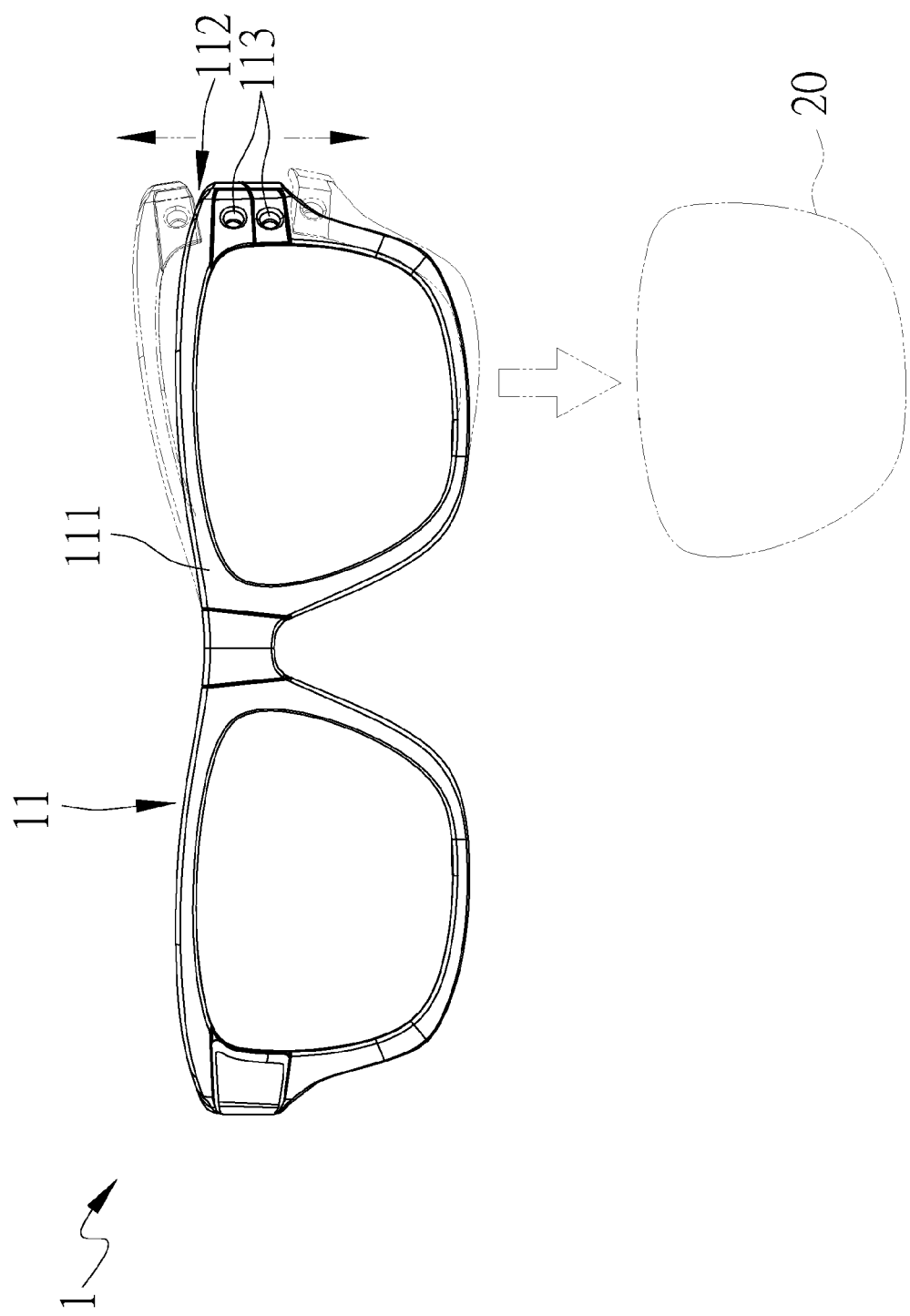

FIG. 3 and FIG. 4 show respectively an exploded diagram and an assembly diagram of the pair of glasses according to an embodiment of the present disclosure. As shown in FIG. 3 and FIG. 4, when a user would like to replace lenses, the fasteners 13 may be removed from the holes 113, and then each of two lens-holding portions 111 may be pulled to enable the adjusting gap 112 to become bigger. Therefore, each old lens may be removed and each new lens may be held by each lens-holding portion 111. Moreover, the hinge 121 of each of two temples 12 may be inserted into the holes 114. Each of two fasteners 13 may connect with two holes 113 to fix the adjusting gap 112. In such example, the adjusting gap 112 has a minimum gap. Accordingly, the replacement of lenses can be completed.

Figure 5:
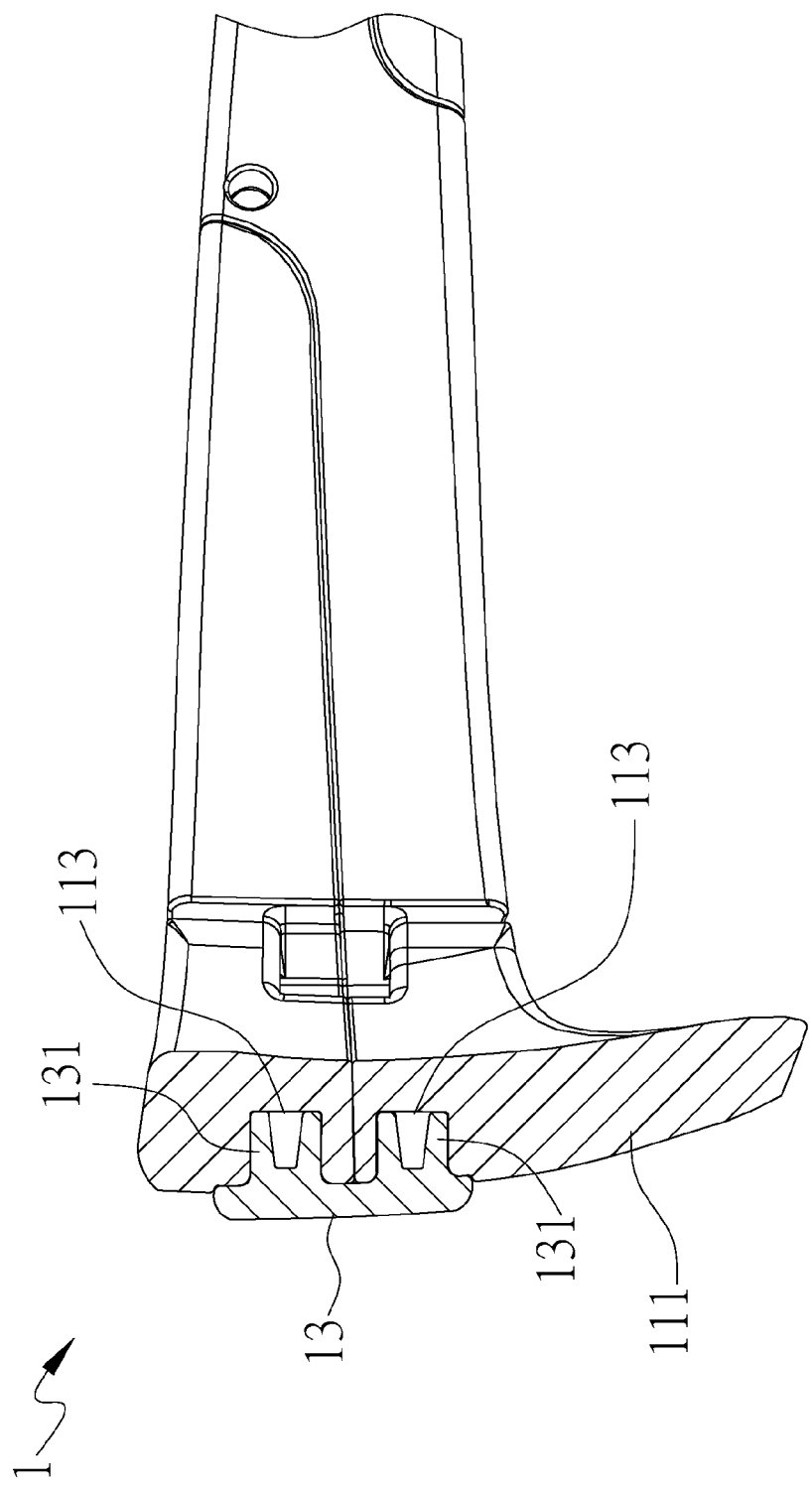
FIG. 5 is a complete assembly diagram of a pair of glasses according to an embodiment of the present disclosure.

FIG. 5 shows a complete assembly diagram of the pair of glasses according to an embodiment of the present disclosure. As shown in FIG. 5, when the replacement of lenses is completed, two fixing shafts 131 of each of two fasteners 13 may be tightly connected with the holes 113. As such, two fasteners 13 may tightly connect the lenses, two temples and two lens-holding portions 111.

In view of the above disclosures, according to the pair of glasses of the present disclosure, an end portion of each of two lens-holding portions may have an adjusting gap, and two holes may be provided on both sides of the adjusting gap. In addition, each of two fasteners may connect with two holes to fix the adjusting gap. Accordingly, if it is necessary to replace the lenses, the fasteners can be removed from the holes, and then each of two lens-holding portions is pulled to enable the adjusting gap to become bigger. As such, each new lens can be held by each lens-holding portion, and fixed by fixing the adjusting gap with each fastener that connects with the holes. Therefore, the replacement of the lens can be completed. The structure of the pair of glasses of the present disclosure is able to replace lenses conveniently and to achieve the objectives of saving money and environmental protection.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. A pair of glasses, comprising:
a frame, having two lens-holding portions and two end portions, wherein each of the two end portions has an adjusting gap, and two first holes are provided on both sides of the adjusting gap;
two temples, respectively pivoted on both end portions of the frame;
two fasteners, wherein each of the two fasteners connects with the two first holes to fix the adjusting gap;
wherein each of the two temples has a hinge, each of the two lens-holding portions has two second holes, the hinge is connected to the two second holes, and the hinge is integrated with each of the two temples.

2. The pair of glasses of claim 1, wherein each of the two fasteners has two fixing shafts that are inserted into the two first holes.

3. The pair of glasses of claim 2, wherein the two fixing shafts are tightly connected with the two first holes.

4. The pair of glasses of claim 1, further comprising a connecting piece, connecting the two lens-holding portions.

\* \* \* \* \*